United States Patent
Takato et al.

[11] Patent Number: 6,044,229
[45] Date of Patent: Mar. 28, 2000

[54] REAL IMAGE MODE FINDER OPTICAL SYSTEM

[75] Inventors: Hidayasu Takato, Hino; Yasutaka Kashiki, Hachioji, both of Japan

[73] Assignee: Olympus Optical Co., Ltd., Tokyo, Japan

[21] Appl. No.: 09/107,474

[22] Filed: Jun. 30, 1998

[30] Foreign Application Priority Data

Jul. 1, 1997 [JP] Japan .................................. 9-175641

[51] Int. Cl.⁷ .................................................. G03B 13/10
[52] U.S. Cl. .......................................... 396/296; 396/378
[58] Field of Search .................................. 396/378, 379, 396/380, 296

[56] References Cited

U.S. PATENT DOCUMENTS 5,771,416 6/1998 Mukai et al. ........................... 396/378

FOREIGN PATENT DOCUMENTS

| 01159623 | 6/1989 | Japan . |
| 04007535 | 1/1992 | Japan . |
| 07270861 | 10/1995 | Japan . |
| 08122857 | 5/1996 | Japan . |

*Primary Examiner*—W.B. Perkey
*Attorney, Agent, or Firm*—Pillsbury Madison & Sutro LLP

[57] ABSTRACT

A real image mode finder optical system includes a field frame switching device interposed between an objective system and an ocular system. An indication part of a field frame inserted by the field frame switching device is placed on the objective side of an intermediate image plane of the real image mode finder optical system. In this way, the finder optical system in which adhesion of dirt is inconspicuous and the view of the visual field of the finder is good can be obtained.

5 Claims, 4 Drawing Sheets

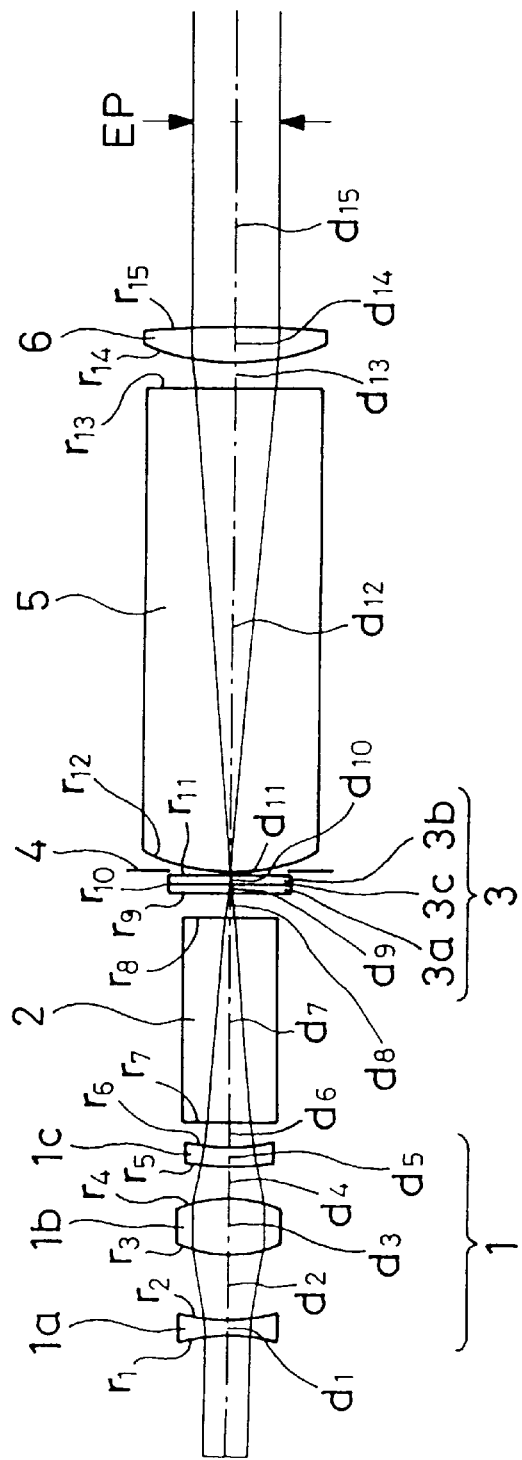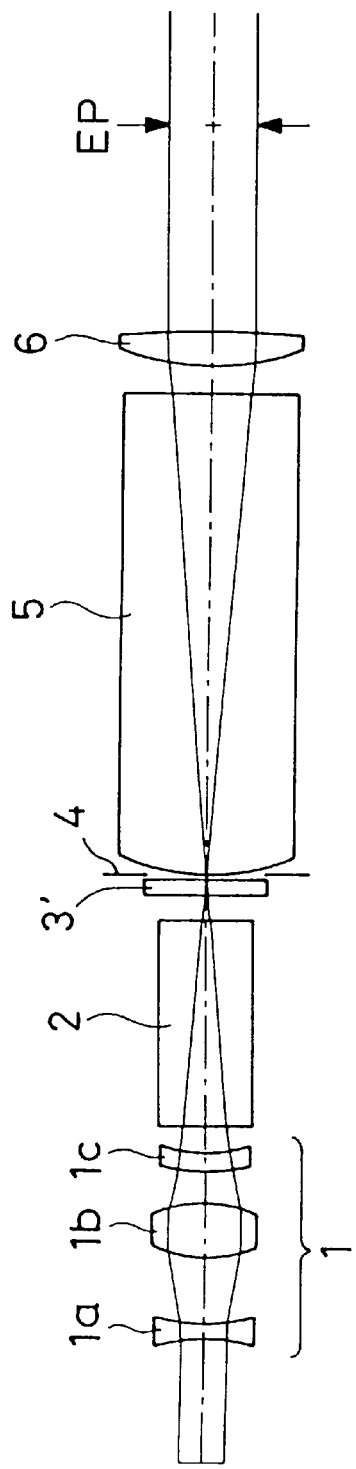

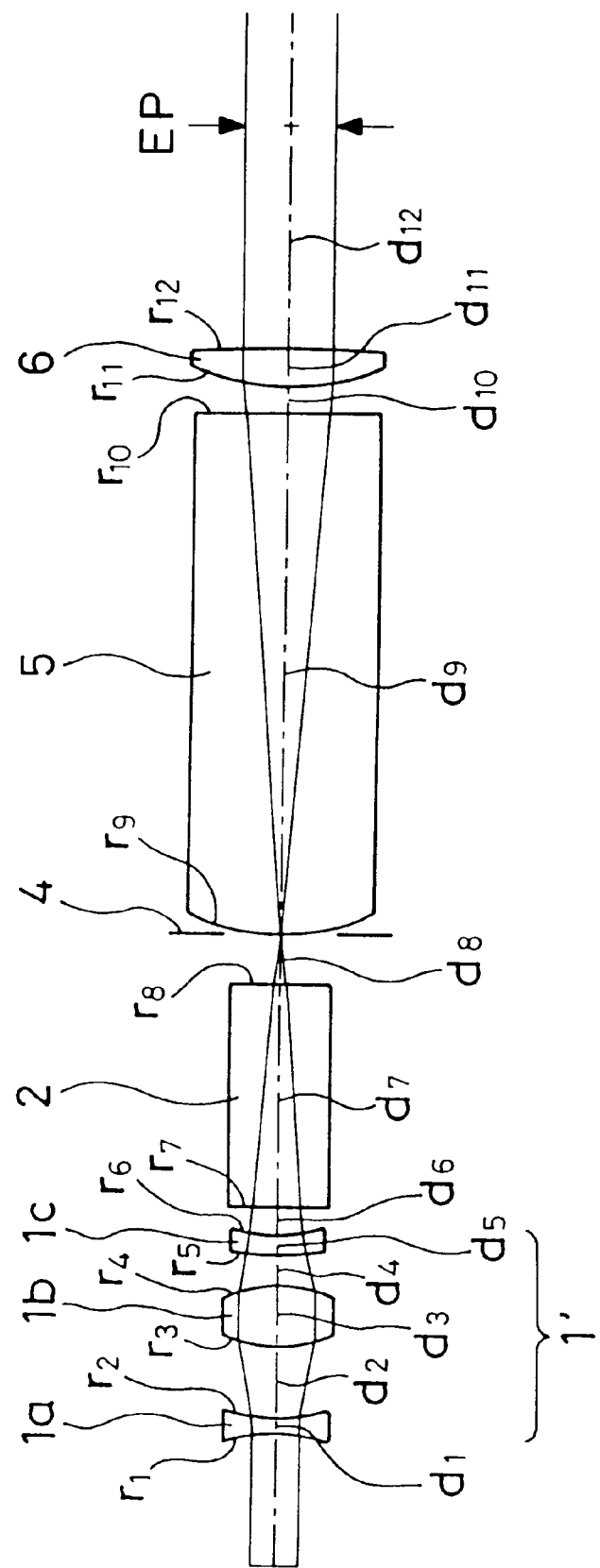

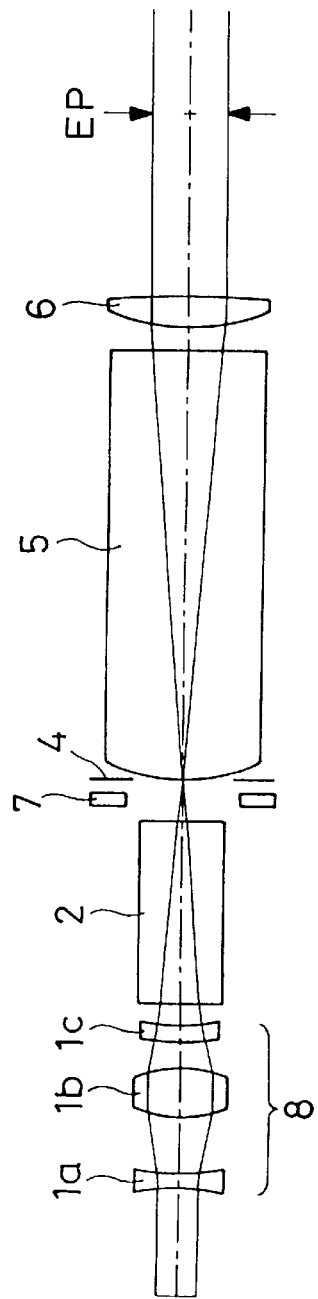
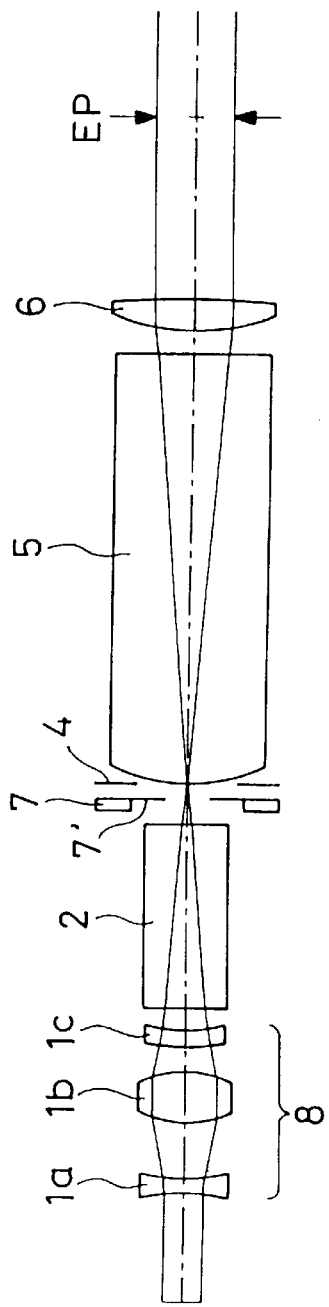

REAL IMAGE MODE FINDER OPTICAL SYSTEM

BACKGROUND OF THE INVENTION

1. Field of the Invention

This invention relates to a real image mode finder optical system used in a lens shutter camera or the like.

2. Description of Related Art

Finder optical systems have been known in which a display, for example, a liquid crystal display, is placed to convey finder information such as that on a field frame. In recent years, cameras, each having the function of switching the field frame of a finder optical system, for example, to that for panoramic photography, have often been used.

In conventional finder optical systems having such field frame switching means, the field frame has been switched in such a way that it is inserted or removed in a vertical or lateral direction. With this technique, however, when the field frame is switched, it is necessary to provide space sufficient for shifting this moving field frame to a nearby place. In a real image mode finder optical system in particular, a prism for erecting an image is often placed close to an intermediate image plane. Since this prism must be enlarged to erect the image, space sufficient for placing the prism is required. Thus, there is a need to make an arrangement such that the space and driving means for shifting the moving field frame do not interfere with the prism for erecting the image. This constitutes a disadvantageous factor with respect to the requirements of current times for compact cameras.

Thus, one means for solving this problem, as set forth, for example, in Japanese Patent Preliminary Publication No. Hei 8-122857 or Hei 7-270861, is proposed in which, for example, a liquid crystal display is adopted as the field frame switching means to thereby save space for the arrangement of an optical system.

Another means refers to a case where two kinds of cameras, one including a field frame switching means and the other excluding the field frame switching means by simplifying the specification of a finder optical system, are provided to supply a user with either of them according to his need. In general, it is desired that, apart from finders, camera bodies have structures in common with one another. For this purpose, a finder optical system is proposed which is capable of having two kinds of specifications in such a way that one of them includes the switching mechanism of the field frame and the other excludes the switching mechanism. This finder optical system will be described in detail below.

In a finder optical system of a type in which a photographic field is changed by moving the field frame, the arrangement of the optical system in a case where the switching means is included is exactly the same as that in a case where the switching means is excluded, with the exception that the moving field frame is placed or not. However, in a finder optical system in which the photographic filed is changed, for example, by a liquid crystal display, if the display is removed to simplify the specification of the finder optical system, an optical path length between an objective system and an ocular system will be changed, and thus an image will cease to be normally formed, with a resulting shift in diopter.

Thus, in Hei 7-270861 mentioned above, the liquid crystal display is used in a case where the field frame switching means is required, while in a case where the liquid crystal display is not placed, a glass or plastic plane-parallel plate is used instead thereof. In this way, the same optical path length is provided in both cases so that a difference in diopter does not arise between them.

In this finder optical system, however, the liquid crystal display or the glass plate located at a position equivalent thereto is placed at the focus position of the objective system. Hence, if dirt particles adhere to the display which is brought to a focus, they become liable to appear to the eye when an observer looks through the finder. Moreover, the use of a liquid crystal for the display easily brings about circumstances such that dirt or dust particles are liable to adhere to the display because of its static electricity, and thus great care must be exercised in assembling the finder.

In recent years, since there is a tendency to decrease the entire finder in size for compactness, it is desired to reduce the focal length of an ocular system (a Lupe system). Consequently, the magnification of the Lupe system is improved, and the problem arises that adhering dirt particles and uneven edges of the field frame (a state of rough edges by working) becomes conspicuous.

SUMMARY OF THE INVENTION

It is, therefore, an object of the present invention to provide a real image mode finder optical system in which adhering dirt particles and uneven edges of the field frame are inconspicuous and there is little influence on the view of the visual field of the finder.

In order to achieve this object, according to one aspect of the present invention, the real image mode finder optical system is provided with a field frame switching means between an objective system and an ocular system. An indication part of a field frame inserted by the switching means is placed on the objective side of an intermediate image plane of the finder optical system.

According to another aspect of the present invention, the real image mode finder optical system has a field frame switching means provided with a liquid crystal display between the objective system and the ocular system. The display is placed on the objective side of the intermediate image plane of the finder optical system.

According to still another aspect of the present invention, the real image mode finder optical system alternatively includes or excludes a field frame switching means with a liquid crystal display. Where the finder optical system has the field frame switching means, the display is placed on the objective side of the intermediate image plane of the finder optical system, while where it has no field frame switching means, a compensating optical system optically equivalent to the display is placed instead thereof in the finder optical system.

This and other objects as well as the features and advantages of the present invention will become apparent from the following detailed description of the preferred embodiments when taken in conjunction with the accompanying drawings.

BRIEF DESCRIPTION OF THE DRAWINGS

FIG. 1 is a sectional view showing the arrangement of a first embodiment of the real image mode finder optical system according to the present invention;

FIG. 2 is a sectional view showing the arrangement of a second embodiment of the real image mode finder optical system according to the present invention;

FIG. 3 is a sectional view showing the arrangement of a third embodiment of the real image mode finder optical system according to the present invention;

FIGS. 4 and 5 are sectional views showing arrangements where a field frame is removed from, and inserted in, a field frame switching means, respectively, in a fourth embodiment of the real image mode finder optical system according to the present invention.

DETAILED DESCRIPTION OF THE PREFERRED EMBODIMENTS

Figure 6A:
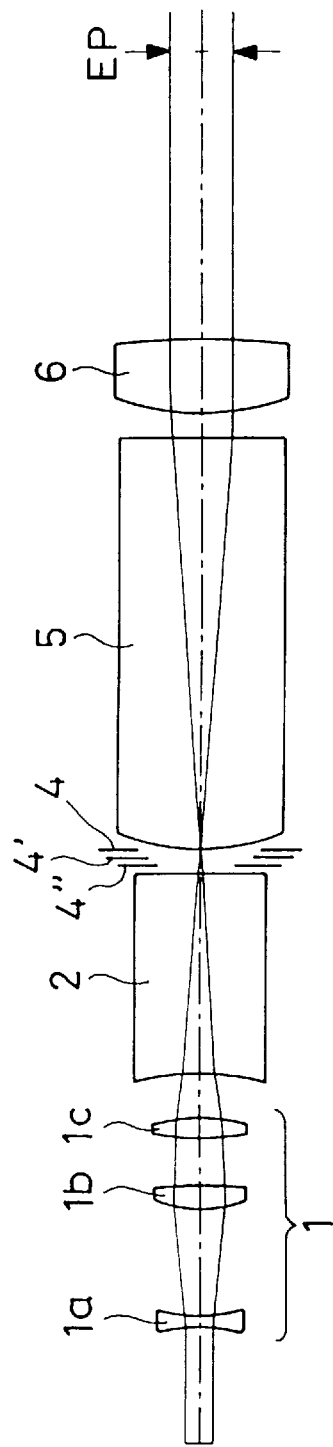
FIGS. 6A, 6B, and 6C are sectional views showing arrangements, at wide-angle, middle, and telephoto positions, respectively, of a fifth embodiment of the real image mode finder optical system according to the present invention.

Before undertaking the explanation of the embodiments, a description will be given of the general function of the real image mode finder optical system according to the present invention.

In the real image mode finder optical system having the field frame switching means between the objective system and the ocular system, the indication part of a field frame inserted by the switching means is placed on the objective side of the intermediate image plane of the finder optical system.

In the present invention, the field frame itself is constructed with a simple line (a black frame of simple form), and it is found that the deterioration of sharpness of its view caused by a slight change in diopter will not raise any problem in practical use. The indication part of the field frame inserted by the switching means is placed on the objective side of the intermediate image plane, and thereby the finder optical system in which adhering dirt particles are invisible to the eye and a compact design is achieved can be constructed.

According to the present invention, the diopter of the inserted field frame is shifted to the plus side. This means that an image appears to the eye of an observer to be located farther than infinity. Basically, the eye is unable to focus upon an image located farther than infinity, and thus the observer will view the image in a state where it is brought to a focus at infinity. That is, in most cases, observations are made with the same diopter as in an object image of the intermediate image plane. This reduces the observer's load. Since in particular the diopter is not adjusted to fine dust, the possibility that the observer views such dust diminishes.

Furthermore, it is possible to make an arrangement such that the position of the entrance surface of a prism practically coincides with that of the intermediate image plane. The entrance surface of the prism can be integrally constructed with a fixed field frame, or a field indication, such as a range measuring target, can be provided on the entrance surface of the prism. In this way, the arrangement is simplified, which is favorable.

It is also possible for a prism of predetermined size required for erecting an image to be located close to an objective lens. This is favorable for compactness. On the other hand, it is conceivable that the indication part of the field frame inserted by the switching means is placed on the ocular side of the intermediate image plane of the finder optical system. In this case, the diopter of the indication part of the inserted field frame becomes minus. The observer, when devoting attention to this indication part, will bring his eye to a focus upon it, and thus the diopter of an observation image is changed. This arrangement increases the observer's load since in particular the eye has the property of readily devoting attention to nearby objects. Moreover, with this arrangement, the field indication cannot be provided on the entrance surface of the prism, and thus this is disadvantageous.

In the real image mode finder optical system having the field frame switching means including the liquid crystal display between the objective system and the ocular system, the display is placed on the objective side of the intermediate image plane of the finder optical system.

In this way, the liquid crystal display in the finder optical system is located at some distance away from the intermediate image plane on the objective side thereof, and thereby an arrangement is made so that the diopter is not adjusted to dirt particles with respect to the diopter of the entire field system. Consequently, even though dirt particles adhere to the display, they cease to be visible to the eye. The diopter of the field frame in this case has a plus value with respect to the diopter of the field system. As a result, although dirt particles are invisible, the sharpness of the view of the field frame itself is deteriorated. However, as mentioned above, this deterioration does not raise any problem in practical use.

In order to hold the balance between the invisibility of dirt particles and the sharpness of the field frame, it is desirable to satisfy the following condition relative to the distance between the liquid crystal display and the intermediate image plane:

$$0.01 < d/fe < 0.05$$

where d is the distance, in terms of air, between the liquid crystal display and the intermediate image plane and fe is the focal length of the ocular system.

If the lower limit of the condition is passed, dirt particles adhering to the liquid crystal display become plainly visible. In particular, for example, where the focal length of the ocular system is reduced to attain the compactness of the finder, the magnification of the ocular system is increased, which is unfavorable. Beyond the upper limit of the condition, the diopter of the field frame extremely deviates from that of the field system of the finder, and the field frame is out of focus. Thus, there is a high possibility that it becomes difficult to determine the field composition of the finder.

In the real image mode finder optical system which alternatively includes or excludes the field frame switching means with the liquid crystal display, the arrangement of the finder optical system is such that where the finder optical system has the field frame switching means, the display is placed on the objective side of the intermediate image plane of the finder optical system, while where it has no field frame switching means, a compensating optical system optically equivalent to the display is placed instead thereof in the finder optical system.

The real image mode finder optical system constructed as mentioned above is capable of easily accommodating a change in specifications by whether the field frame switching means is provided. This finder optical system employs an optical element, instead of the liquid crystal display, which is a plane-parallel plate made of glass or plastic, optically equivalent thereto. This field frame display and the compensating optical system, as in the above case, are placed on the objective side of the intermediate image plane. In this way, the finder in which dirt particles adhering thereto are invisible in either specification can be provided.

The embodiments of the present invention will be explained in detail below.

First Embodiment

FIG. 1 shows the arrangement of the real image mode finder optical system having a field frame switching function in the first embodiment of the present invention. In this figure, reference numeral 1 denotes an objective system composed of a first lens 1a, a second lens 1b, and a third lens 1c; 2, a first prism for erecting an image; 3, a liquid crystal display constituting a field frame switching means, composed of glass base plates 3a and 3b and a liquid crystal section 3c sandwiched between, and enclosed by, the plates 3a and 3b, including information of a field frame for panoramic photography; 4, a fixed field frame for normal photography, located at the focus position of the objective system 1; 5, a second prism for erecting the image; and 6, an ocular system. A range measuring mark is stamped on the entrance surface of the prism 5 located at the same position as the field frame. Also, in this optical system, the magnification of a finder changes with variations of spaces between respective lenses 1a, 1b, and 1c of the objective system 1. The surfaces of individual optical components, in order from the object side, are labeled $r_1$–$r_{15}$ in FIG. 1. Aspherical surfaces are used for both surfaces $r_3$ and $r_4$ of the second lens 1b, both surfaces $r_5$ and $r_6$ of the third lens 1c, and a surface $r_{14}$ on the object side of the ocular system 6.

Subsequently, numerical data of the first embodiment are shown below. In the numerical data, ω is a half angle of view of emergence (°); EP is an eyepoint; m is a finder magnification; $r_1$, $r_2$, . . . are radii of curvature (mm) of individual lens and prism surfaces; $d_1$, $d_2$, . . . are distances (mm) between individual surfaces; $n_1$, $n_2$, . . . are refractive indices of individual lenses and prisms in the d line; $v_1$, $v_2$, . . . are Abbe's numbers of individual lenses and prisms; r is a paraxial radius of curvature; k is a conic constant; and $A_4$, $A_6$, $A_8$, and $A_{10}$ are aspherical coefficients of the fourth, sixth, eighth, and tenth orders, respectively. These symbols are applied to all the embodiments showing the numerical data Magnification (m) 0.40× (wide-angle)–0.61× (middle)–0.84× (telephoto)

Half angle of view (ω) 24.42° (wide-angle)–14.56° (middle)–10.60° (telephoto)

$r_1 = -8.096$
    $d_1 = 1.00$    $n_1 = 1.58423$    $v_1 = 30.49$
$r_2 = 10.255$
    $d_2 = 5.58$ (wide-angle), 2.65 (middle), 1.12 (telephoto)
$r_3 =$ aspherical
    $d_3 = 3.15$    $n_3 = 1.52542$    $v_3 = 55.78$
$r_4 =$ aspherical
    $d_4 = 0.83$ (wide-angle), 3.11 (middle), 5.62 (telephoto)
$r_5 =$ aspherical
    $d_5 = 1.00$    $n_5 = 1.58423$    $v_5 = 30.49$
$r_6 =$ aspherical
    $d_6 = 1.25$ (wide-angle), 1.25 (middle), 1.25 (telephoto)
$r_7 = \infty$
    $d_7 = 12.00$    $n_7 = 1.52542$    $v_7 = 55.78$
$r_8 = \infty$
    $d_8 = 0.58$
$r_9 = \infty$
    $d_9 = 0.55$    $n_9 = 1.51633$    $v_9 = 64.14$
$r_{10} = \infty$
    $d_{10} = 0.55$    $n_{10} = 1.51633$    $v_{10} = 64.14$
$r_{11} = \infty$
    $d_{11} = 0.20$
$r_{12} = 9.163$
    $d_{12} = 27.25$    $n_{12} = 1.52542$    $v_{12} = 55.78$
$r_{13} = \infty$
    $d_{13} = 1.00$
$r_{14} =$ aspherical
    $d_{14} = 2.00$    $n_{14} = 1.49241$    $v_{14} = 57.66$
$r_{15} = -19.749$
    $d_{15} = 15.50$ (EP)

-continued

Aspherical coefficients

Third surface $r = 5.321$, $k = 0.087$
$A_4 = -8.62068 \times 10^{-4}$, $A_6 = 5.42957 \times 10^{-5}$,
$A_8 = -5.60860 \times 10^{-8}$, $A_{10} = 3.21303 \times 10^{-7}$
Fourth surface $r = -6.309$, $k = 0.000$
$A_4 = 1.53834 \times 10^{-3}$, $A_6 = 7.64871 \times 10^{-5}$,
$A_8 = 7.13036 \times 10^{-7}$, $A_{10} = 6.65118 \times 10^{-7}$
Fifth surface $r = 12.292$, $k = 0.000$
$A_4 = -4.60122 \times 10^{-3}$, $A_6 = 1.81806 \times 10^{-4}$,
$A_8 = -3.74936 \times 10^{-6}$
Sixth surface $r = 6.261$, $k = 0.000$
$A_4 = -5.52830 \times 10^{-3}$, $A_6 = 2.73967 \times 10^{-4}$,
$A_8 = -5.66016 \times 10^{-6}$
Fourteenth surface $r = 18.455$, $k = 0.000$
$A_4 = -1.07557 \times 10^{-4}$, $A_6 = 6.64482 \times 10^{-7}$,
$A_8 = -1.63602 \times 10^{-9}$ Second Embodiment FIG. 2 shows the arrangement of the real image mode finder optical system having no field frame switching function in the second embodiment of the present invention. The diagram of FIG. 2 is exactly the same as that of FIG. 1 with the exception that a compensating optical system 3' equivalent to the liquid crystal display 3 is placed instead thereof. In other words, the real image mode finder optical system of the second embodiment can be mounted in a camera body for that of the first embodiment.

Third Embodiment

FIG. 3 shows the arrangement of the real image mode finder optical system having no field frame switching function in the third embodiment of the present invention. In order to adjust the shift of the focus position of the objective system which results from the absence of the liquid crystal display, an objective system 1' is different from the objective system 1 shown in FIG. 1 in space between the second and third lenses 1b and 1c. In FIG. 3, the first and second prisms 2 and 5 for erecting the image, the ocular system 6, the fixed field frame 4, and the range measuring mark are identical with those described in reference to FIG. 1. In this way, the real image mode finder optical system of the third embodiment can be easily mounted in the camera body for that of the first embodiment.

Numerical data in the third embodiment are shown below. Also, in the numerical data, only the numerical value of $d_4$ in the numerical data of the first embodiment is changed and the other numerical values are identical with those of the first embodiment. Thus, if only the value $d_4$ is changed to adjust the shift of the focus position of the objective system resulting from the absence of the liquid crystal display, it is found that even the finder of the third embodiment devoid of the liquid crystal display 3 can be mounted in the same camera body as in the first embodiment.

The real image mode finder optical system of the present invention is applicable to a fixed focus finder, not to speak of a variable magnification finder. Although, in the third embodiment, the diopter is adjusted by changing the space between the second and third lenses with respect to FIGS. 1 and 3, the diopter adjustment is not necessarily limited to this technique. That is, the entire objective system or the ocular system may be moved.

Magnification (m) 0.40× (wide-angle)–0.61× (middle)–0.84× (telephoto)
Half angle of view (ω) 24.42° (wide-angle)–14.56° (middle)–10.60° (telephoto)

$r_1 = -8.096$
  $d_1 = 1.00$    $n_1 = 1.58423$    $v_1 = 30.49$
$r_2 = 10.255$
  $d_2 = 5.58$ (wide-angle), 2.65 (middle), 1.12 (telephoto)
$r_3$ = aspherical
  $d_3 = 3.15$    $n_3 = 1.52542$    $v_3 = 55.78$
$r_4$ = aspherical
  $d_4 = 0.65$ (wide-angle), 2.93 (middle), 5.44 (telephoto)
$r_5$ = aspherical
  $d_5 = 1.00$    $n_5 = 1.58423$    $v_5 = 30.49$
$r_6$ = aspherical
  $d_6 = 1.25$ (wide-angle), 1.25 (middle), 1.25 (telephoto)
$r_7 = \infty$
  $d_7 = 12.00$   $n_7 = 1.52542$    $v_7 = 55.78$
$r_8 = \infty$
  $d_8 = 1.88$
$r_9 = 9.163$
  $d_9 = 27.25$   $n_9 = 1.52542$    $v_9 = 55.78$
$r_{10} = \infty$
  $d_{10} = 1.00$
$r_{11} = \infty$
  $d_{11} = 2.00$  $n_{11} = 1.49241$   $v_{11} = 57.66$
$r_{12} = -19.749$
  $d_{12} = 15.50$ (EP)
Aspherical coefficients Third surface $r = 5.321, k = 0.087$
$A_4 = -8.62068 \times 10^{-4}, A_6 = 5.42957 \times 10^{-5},$
$A_8 = -5.60860 \times 10^{-8}, A_{10} = 3.21303 \times 10^{-7}$ Fourth surface $r = -6.309, k = 0.000$
$A_4 = 1.53834 \times 10^{-3}, A_6 = 7.64871 \times 10^{-5},$
$A_8 = 7.13036 \times 10^{-7}, A_{10} = 6.65118 \times 10^{-7}$ Fifth surface $r = 12.292, k = 0.000$
$A_4 = -4.60122 \times 10^{-3}, A_6 = 1.81806 \times 10^{-4},$
$A_8 = -3.74936 \times 10^{-6}$ Sixth surface $r = 6.261, k = 0.000$
$A_4 = -5.52830 \times 10^{-3}, A_6 = 2.73967 \times 10^{-4},$
$A_8 = -5.66016 \times 10^{-6}$ Eleventh surface $r = 18.455, k = 0.000$
$A_4 = -1.07557 \times 10^{-4}, A_6 = 6.64482 \times 10^{-7},$
$A_8 = -1.63602 \times 10^{-9}$ Fourth Embodiment FIG. 4 shows the arrangement of the real image mode finder optical system where a field frame is not inserted by a switching means 7 in the fourth embodiment of the present invention. In this case, a field frame to be observed is the fixed field frame 4. FIG. 5 shows the arrangement where a field frame 7' is inserted by the switching means 7. In this case, a field frame to be observed is the field frame 7', and the visual field of the finder becomes narrower than in FIG. 4. The field frame 7' is placed on the plus side (the objective side) of the intermediate image plane and appears to the eye to be somewhat blurred. There is thus the effect that even when the edges of a field frame member are not clear lines, but have some degree of roughness, such roughness is inconspicuous. Moreover, the field frame 7', which is inserted on the objective side of the field frame 4, is such that the diopter is further shifted to the plus side and the blurring of the field frame 7' becomes prominent. Since, however, the field frame 7' is lower in frequency of use than the standard field frame 4, there is little problem in practical use. By mounting the same finder optical system devoid of the field frame switching means, a camera body which need not have the field frame switching means can be produced, and this is favorable.

Fifth Embodiment

Figure 6B:
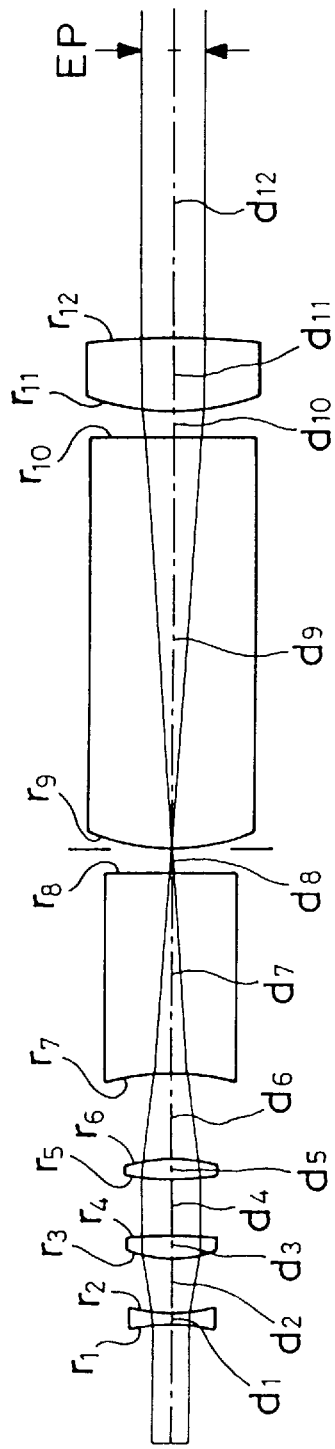
Figure 6C:
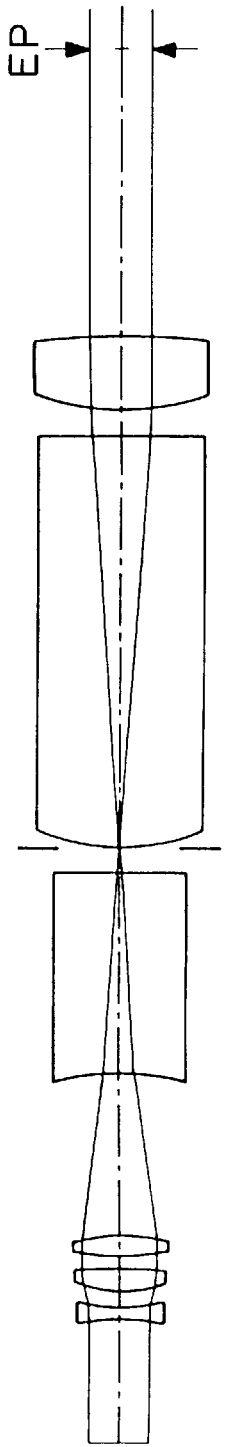

FIGS. 6A, 6B, and 6C show arrangements of the real image mode finder optical system where two field frames are inserted by switching means in the fifth embodiment of the present invention. In this embodiment, a target indicating an in-focus position is stamped on the entrance surface of the prism 5. A C-size field frame 4' shown in FIG. 6A is a frame for narrowing the visual field in a lateral direction with respect to the standard field frame 4. Similarly, a P-size field frame 4" is a frame for narrowing the visual field in a vertical direction.

The following are numerical data of the fifth embodiment. The numerical data additionally include a numerical table of paraxial radii of curvature and face-to-face spaces where the standard (fixed) field frame 4, the C-size field frame 4', and the P-sized field frame 4" are interposed between an exit surface $r_8$ of the first prism and an entrance surface $r_9$ of the second prism.

Magnification (m) 0.43× (wide-angle)–0.63× (middle)–1.00× (telephoto)
Half angle of view (ω) 26.4° (wide-angle)–17.4° (middle)–10.60° (telephoto)

$r_1 = -14.000$
  $d_1 = 0.700$   $n_1 = 1.58423$    $v_1 = 30.49$
$r_2$ = aspherical
  $d_2 = 6.819$ (wide-angle), 3.533 (middle), 1.062 (telephoto)
$r_3$ = aspherical
  $d_3 = 1.500$   $n_3 = 1.49241$    $v_3 = 57.66$
$r_4 = -29.755$
  $d_4 = 3.000$ (wide-angle), 3.500 (middle), 0.800 (telephoto)
$r_5$ = aspherical
  $d_5 = 1.200$   $n_5 = 1.49241$    $v_5 = 57.66$
$r_6$ = aspherical
  $d_6 = 2.781$ (wide-angle), 5.490 (middle), 10.354 (telephoto)
$r_7$ = aspherical
  $d_7 = 13.000$  $n_7 = 1.52542$    $v_7 = 55.78$
$r_8 = \infty$
  $d_8 = 1.500$
$r_9 = 12.500$
  $d_9 = 26.500$  $n_9 = 1.52542$    $v_9 = 55.78$
$r_{10} = -100.000$
  $d_{10} = 1.500$
$r_{11}$ = aspherical
  $d_{11} = 4.750$  $n_{11} = 1.52542$   $v_{11} = 55.78$
$r_{12} = -44.792$
  $d_{12} = 18.500$ (EP)

| Surface | Paraxial radius of curvature | Face-to-face space |
|---|---|---|
| Exit surface $r_8$ of the first prism | ∞ | 0.5 |
| P-size field frame 4" | ∞ | 0.4 |
| C-size field frame 4' | ∞ | 0.4 |
| Standard field frame 4 | ∞ | 0.2 |
| Entrance surface $r_{11}$ of the second surface | 12.5 | |

Aspherical coefficients

Second surface $r = 8.309, k = -3.67985$
$A_4 = 3.79710 \times 10^{-4}, A_6 = 3.74134 \times 10^{-5},$ -continued $A_8 = -4.16775 \times 10^{-6}$, $A_{10} = -1.63079 \times 10^{-7}$
Third surface $r = 7.378$, $k = -1.23269$
$A_4 = -3.27290 \times 10^{-4}$, $A_6 = 5.88174 \times 10^{-5}$,
$A_8 = -7.24989 \times 10^{-6}$, $A_{10} = 2.71574 \times 10^{-7}$
Fifth surface $r = -13.803$, $k = -15.94329$
$A_4 = 6.82217 \times 10^{-5}$, $A_6 = -1.33147 \times 10^{-5}$,
$A_8 = 2.55220 \times 10^{-6}$, $A_{10} = 1.48482 \times 10^{-8}$
Sixth surface $r = -14.497$, $k = 7.90302$
$A_4 = -2.91010 \times 10^{-4}$, $A_6 = 5.86320 \times 10^{-5}$,
$A_8 = -1.22821 \times 10^{-6}$, $A_{10} = 7.75258 \times 10^{-8}$
Seventh surface $r = -20.244$, $k = 9.12799$
$A_4 = -7.80112 \times 10^{-4}$, $A_6 = 4.14229 \times 10^{-5}$,
$A_8 = -1.62797 \times 10^{-6}$, $A_{10} = 0.00000$
Eleventh surface $r = 14.759$, $k = 0.89931$
$A_4 = -1.84732 \times 10^{-4}$, $A_6 = 6.20229 \times 10^{-6}$,
$A_8 = -2.57344 \times 10^{-7}$, $A_{10} = 3.79816 \times 10^{-9}$

What is claimed is:

1. A real image mode finder optical system, comprising:
a field frame switching unit provided with a liquid crystal display interposed between an objective system and an ocular system,
wherein said liquid crystal display is placed on an objective side of an intermediate image plane of said real image mode finder optical system.

2. A real image mode finder optical system alternatively comprising a field frame switching unit with a liquid crystal display or excluding said field frame switching unit,
wherein when said field frame switching unit is included, said liquid crystal display is placed on an objective side of an intermediate image plane of said real image mode finder optical system, while when said field frame switching unit is excluded, a compensating optical system optically equivalent to said liquid crystal display is placed instead of said liquid crystal display.

3. A real image mode finder optical system alternatively comprising a first optical system including a field frame switching unit with a liquid crystal display or a second optical system excluding said field frame switching unit,
wherein said first optical system is constructed with optical members substantially identical with said second optical system, except for said liquid crystal display, and said first optical system is different in partial space between lenses from said second optical system to correct an optical path difference caused by whether said liquid crystal display is placed.

4. A real image mode finder optical system according to any one of claims 2, 3 or 4, wherein said real image mode finder optical system including said field frame switching unit satisfies the following condition:

$$0.01 < d/fe < 0.05$$

where d is a distance, in terms of air, between said liquid crystal display and an intermediate image plane and fe is a focal length of an ocular system.

5. A real image mode finder optical system comprising:
a field frame switching unit interposed between an objective system and an ocular system, and
a fixed field frame disposed between said objective system and said ocular system,
wherein said fixed field frame is placed on an objective side of an intermediate image plane of the finder optical system, and
wherein an indication part of a field frame inserted by said field frame switching unit is placed on an objective side of said fixed field frame.

* * * * *

UNITED STATES PATENT AND TRADEMARK OFFICE
CERTIFICATE OF CORRECTION

PATENT NO. : 6,044,229
DATED : March 28, 2000
INVENTOR(s) : TAKATO et al.

It is certified that error appears in the above-identified patent and that said Letters Patent is hereby corrected as shown below:

Column 10, line 17 (Claim 4, line 2), change "2, 3 or 4" to --1, 2 or 3--.

Signed and Sealed this

Tenth Day of April, 2001

NICHOLAS P. GODICI

*Attest:*

*Attesting Officer*      Acting Director of the United States Patent and Trademark Office